(12) United States Patent
Caveney et al.

(10) Patent No.: US 8,686,870 B2
(45) Date of Patent: Apr. 1, 2014

(54) PHYSICAL LAYER MANAGEMENT FOR INTERCONNECT CONFIGURATIONS USING RFID CHIP TECHNOLOGY

(75) Inventors: Jack E. Caveney, North Palm Beach, FL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 272 days.

(21) Appl. No.: 13/255,826

(22) PCT Filed: Mar. 26, 2010

(86) PCT No.: PCT/US2010/028866
§ 371 (c)(1),
(2), (4) Date: Nov. 11, 2011

(87) PCT Pub. No.: WO2010/111616
PCT Pub. Date: Sep. 30, 2010

(65) Prior Publication Data
US 2012/0045928 A1  Feb. 23, 2012

Related U.S. Application Data

(60) Provisional application No. 61/163,735, filed on Mar. 26, 2009.

(51) Int. Cl.
*G08B 21/00* (2006.01)
*G08B 13/14* (2006.01)
*G06K 19/077* (2006.01)
*H01R 13/641* (2006.01)
*H01R 13/717* (2006.01)

(52) U.S. Cl.
CPC ...... *G08B 13/1409* (2013.01); *G06K 19/07749* (2013.01); *H01R 13/641* (2013.01); *H01R 13/7175* (2013.01)
USPC ............ 340/687; 439/489; 439/490; 379/326

(58) Field of Classification Search
CPC ................... G08B 13/1409; G06K 19/07749; H01R 13/641; H01R 13/7175; H04Q 1/142
USPC ............ 340/687, 572.1, 572.8; 235/375, 492; 439/489, 490; 379/326
See application file for complete search history.

(56) References Cited

U.S. PATENT DOCUMENTS

| | | | |
|---|---|---|---|
| 6,784,802 B1 * | 8/2004 | Stanescu | 340/687 |
| 7,468,669 B1 * | 12/2008 | Beck et al. | 340/572.1 |
| 7,605,707 B2 * | 10/2009 | German et al. | 340/572.8 |
| 7,757,936 B2 * | 7/2010 | Aguren et al. | 235/375 |
| 8,092,249 B2 * | 1/2012 | German et al. | 439/489 |
| 8,116,434 B2 * | 2/2012 | German et al. | 379/326 |
| 2008/0100440 A1 * | 5/2008 | Downie et al. | 340/572.1 |
| 2008/0122579 A1 | 5/2008 | German et al. | |
| 2012/0256005 A1 * | 10/2012 | Kotyrba | 235/492 |

FOREIGN PATENT DOCUMENTS

| | | |
|---|---|---|
| GB | 2359702 A | 8/2001 |
| WO | 2006063023 A1 | 6/2006 |

* cited by examiner

*Primary Examiner* — John A Tweel, Jr.
(74) *Attorney, Agent, or Firm* — Christopher S. Clancy; Christopher K. Marlow

(57) ABSTRACT

An intelligent physical layer management system is provided that includes active electronic hardware, firmware, mechanical assemblies, cables, and software that guide, monitor, and report on the process of connecting and disconnecting patch cords plugs in an interconnect patching environment. RFID tag integrated chips are used to identify which switch port a patch cord is plugged into. The system is capable of monitoring patch cord connections to detect insertions or removals of patch cords or plugs. In addition, the system can map the patch field in interconnect configurations.

8 Claims, 10 Drawing Sheets

| Fig. # | CM Signal | # of Pairs | Plug (Switch Side) | Patch Cable | Plug (Panel Side) | Jack (Panel Side) | Mounting Bar | Modular: Fiber & Copper |
|---|---|---|---|---|---|---|---|---|
| 2 | No | 1 Ext. | Custom (w/LEDs) | Custom (10 Wire) | Custom | Modular (Std.) | Passive | Yes |
| 4 | No | 1 Ext. | Custom (w/LEDs) | Custom (10 Wire) | Custom | Modular (Std.) | Active | Yes |
| 7 | Yes | 4 | Custom (w/LEDs) | Standard | Standard | Custom (PCB) | Passive | No |
| 8 | Yes | 2 | Custom (w/LEDs) | Standard | Standard | Custom (PCB) | Passive | No |
| 9 | Yes | 2 | Custom (w/LEDs) | Standard | Standard | Custom (PCB) | Active | No |
| 10 | Yes | 2 | Custom | Standard | Standard | Custom (PCB) | Active | No |

FIG.1

PHYSICAL LAYER MANAGEMENT FOR INTERCONNECT CONFIGURATIONS USING RFID CHIP TECHNOLOGY

TECHNICAL FIELD

The present application relates to network physical layer management systems, and more particularly to a physical layer management system for interconnect deployments using radio frequency identification (RFID) modules and signaling systems for communicating with the RFID modules.

BACKGROUND

Communications networks are growing in number and complexity, and are continually being interconnected to satisfy customers' needs. Patch panels are used in communications networks as intermediate elements between horizontal cabling (to which endpoint devices such as computers and telephones are connected) and network switches. Specifically a patch panel includes a panel of network ports that connect incoming and outgoing lines of a local area network (LAN) or other communication system. In a LAN, for example, the patch panel connects the network's computers to switches or routers that enable the LAN to connect to the Internet or another wide area network (WAN). Connections are made with patch cords. The patch panel allows connections to be arranged and rearranged by plugging and unplugging the patch cords.

When physical connections between endpoint devices and network switches are added, moved or removed, patch panels are the points at which technicians complete the required installations or removals of patch cords within patch fields. Patch panels offer the convenience of allowing technicians to quickly change the path of selected signals.

Patch panels are typically deployed in two different configurations: cross-connect configurations, in which two patch panels are located along a network pathway between, for example, network switches and user outlets; and interconnect configurations, in which one patch panel is located in the network pathway. In a cross-connect configuration, the patch field is generally considered to be the area between the two patch panels. In an interconnect configuration, the patch field is between the patch panel and the network switch.

It is important to maintain a record of changes that are made to patch cord connections within the patch field. Proper documentation of changes in the patch field assures that the routing of patch cords is always known and further assures that any future changes are completed correctly.

Human error associated with the implementation and maintenance of physical cable connections between network communication equipment can result in significant negative impact to a network. Such negative impact can be avoided through automatic verification of network cable installation and removal work orders, such as move-add-change (MAC) work orders, implemented by network technicians.

SUMMARY

Systems for guiding patch cord installations and removals in an interconnect patch panel configuration are provided and automatic documentation of the patch field is enabled. In some embodiments, signals for physical layer management are placed on an additional wire pair not used for Ethernet signaling. In other embodiments, signals relevant to physical layer management are placed on Ethernet cables in a common-mode technique that does not interfere with the standard differential mode Ethernet signaling used to carry data on the network. The management signals are used to communicate with RFID tags via RFID antennas that are located in patch cord plugs.

RFID tags are provided on a mounting bar attached to the face of an Ethernet switch. The RFID tags can communicate with RFID antennas provided in the switch plug of specialized patch cords and can be used to identify the switch port that a switch plug is installed in.

These and other aspects of the present invention are explained to those of ordinary skill in the art in the following detailed description, with reference to the drawings. It should be understood that the embodiments noted herein are not intended to limit the scope of the invention.

BRIEF DESCRIPTION OF FIGURES

FIG. 1 is a chart summarizing the features of various embodiments of the present invention;

DETAILED DESCRIPTION

The present application provides a system that uses RFID antennas provided on specialized patch cords for use between patch panels and network switches to enable physical layer management of the connections between network switches and patch panels in interconnect patch panel configurations.

FIG. 1 is a chart summarizing the various embodiments of the present invention, including the features and requirements of the various embodiments, listed by figure number in the leftmost column. It is preferred for all embodiments of the present invention to be capable of working with Power over Ethernet (PoE) networks.

Figure 2:
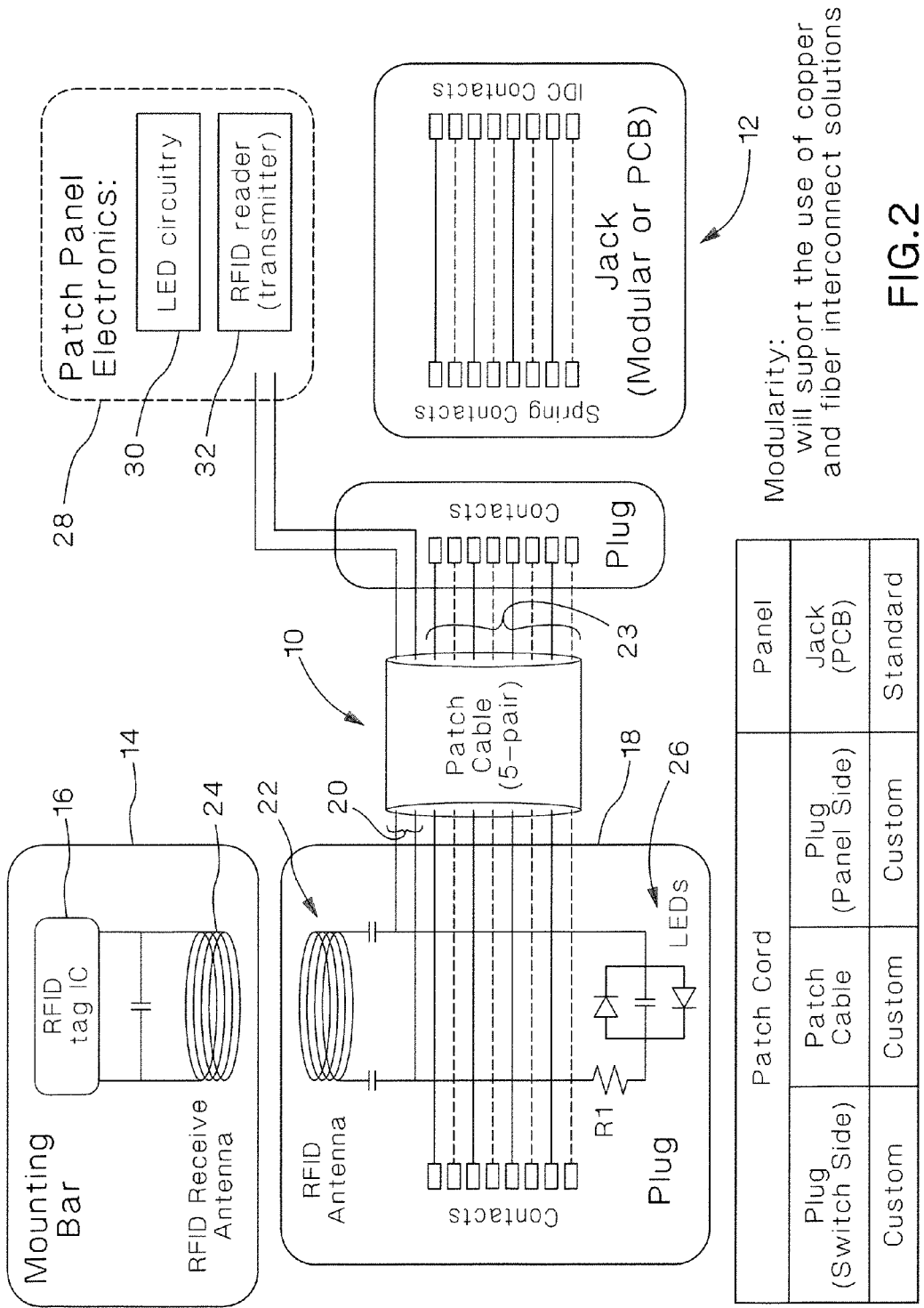
FIG. 2 is a schematic diagram of a patch cable connection between a network switch port and a patch panel according to one embodiment of the present invention.

FIG. 2 is a schematic diagram of a specialized patch cable 10 connected between a patch panel port 12 and a switch plug 18. The switch port is provided on a network switch having a mounting bar 14, with an RFID tag integrated circuit (IC) 16 associated with the switch port into which the switch plug 18 is inserted. The specialized patch cable 10 is provided with a fifth pair of conductors 20, in addition to the standard four pairs of conductors 23 used for copper-based Ethernet patch cords.

The fifth pair of conductors 20 is connected to an RFID antenna 22 in the switch plug 18 that is adapted to communicate via an RFID receive antenna 24 with the RFID tag IC 16 associated with the switch port that the switch plug 18 is plugged into. An LED assembly 26 is also connected to the fifth pair of conductors 20 as shown in FIG. 2. When the specialized patch cable 10 is plugged into a patch panel port 12, the fifth pair of conductors 20 is in communication with patch panel electronics 28 comprising LED circuitry 30 that can address and control the LED assembly 26 and an RFID transmitter 32 that is adapted to communicate with the RFID antenna 22. Via this RFID communication, the patch panel is capable of determining which port of the switch the switch plug 18 is plugged into, because the RFID tag IC 16 is provided with a specific ID that is a proxy for its associated switch port. Patch panels according to the present invention are preferably in communication with a network management system (NMS) such that the NMS can be automatically updated with the correct patching information showing which port of a switch each patch panel port is connected to. Further, the NMS can be immediately updated whenever a patch cord connection changes, and the NMS can use the signaling LEDs provided near switch ports and within switch plugs to guide technicians in performing connectivity changes in the patch field.

In one embodiment the LED assembly 26 comprises two LEDs: a red LED and a green LED. The LED circuitry 30 provided in the patch panel electronics 28 is adapted to control these LEDs with signaling lights or patterns that indicate switch plug insertion or removal instructions to a technician.

Figure 3:
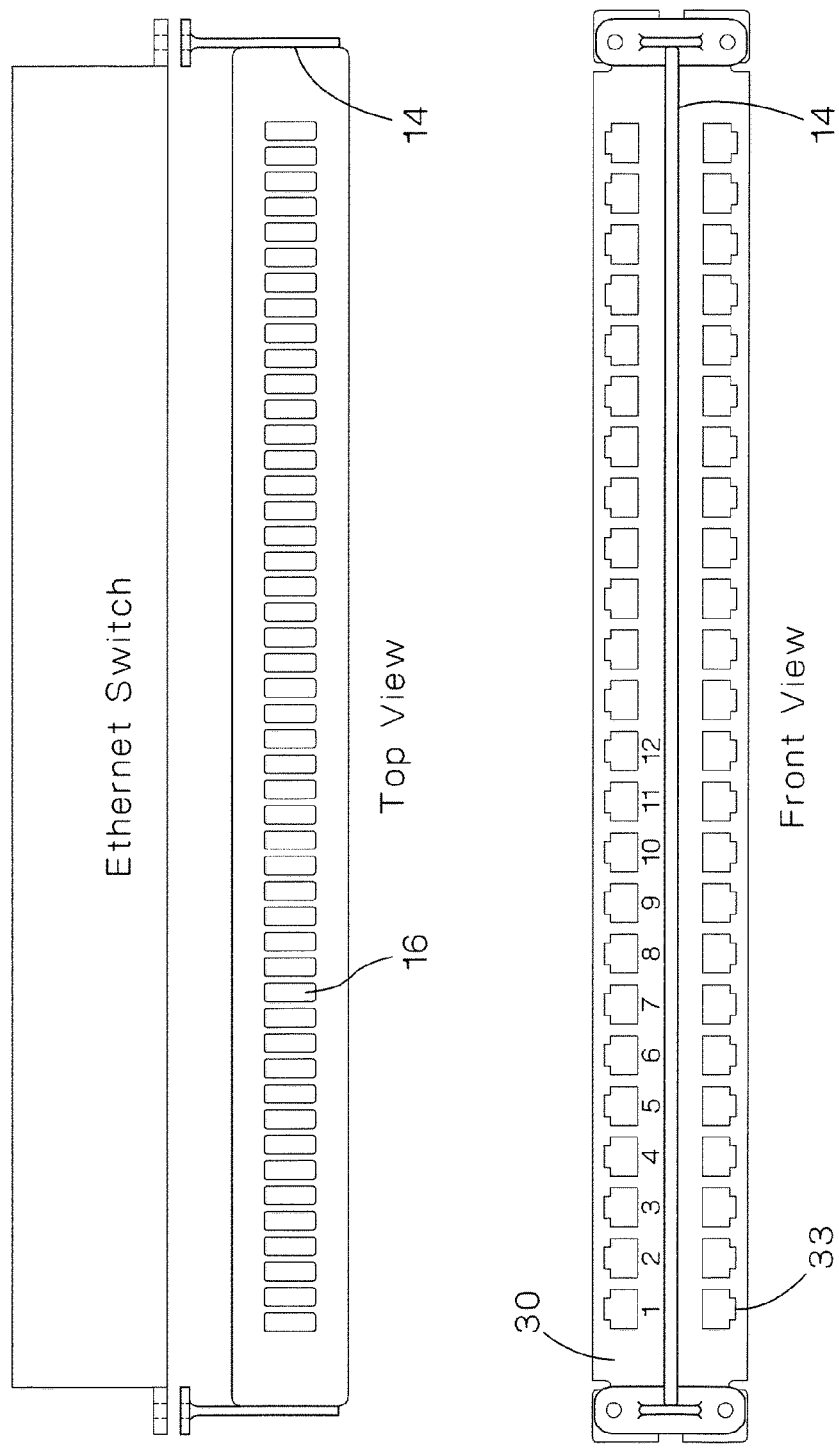
FIG. 3 contains front and top views of an RFID tag mounting bar mounter to an Ethernet switch.

FIG. 3 shows the mounting bar 14 mounted to an Ethernet switch 30 having a plurality of switch ports 33. The mounting bar is preferably mounted between top and bottom rows of switch ports 33, and is provided with RFID tag ICs 16 corresponding to each of the switch ports 33. The RFID tag ICs are positioned so that RFID antennas 22 in switch plugs 18 (as shown in FIG. 1) can communicate with the RFID tag IC 16 associated with the switch port 33 into which they are plugged.

Figure 4:
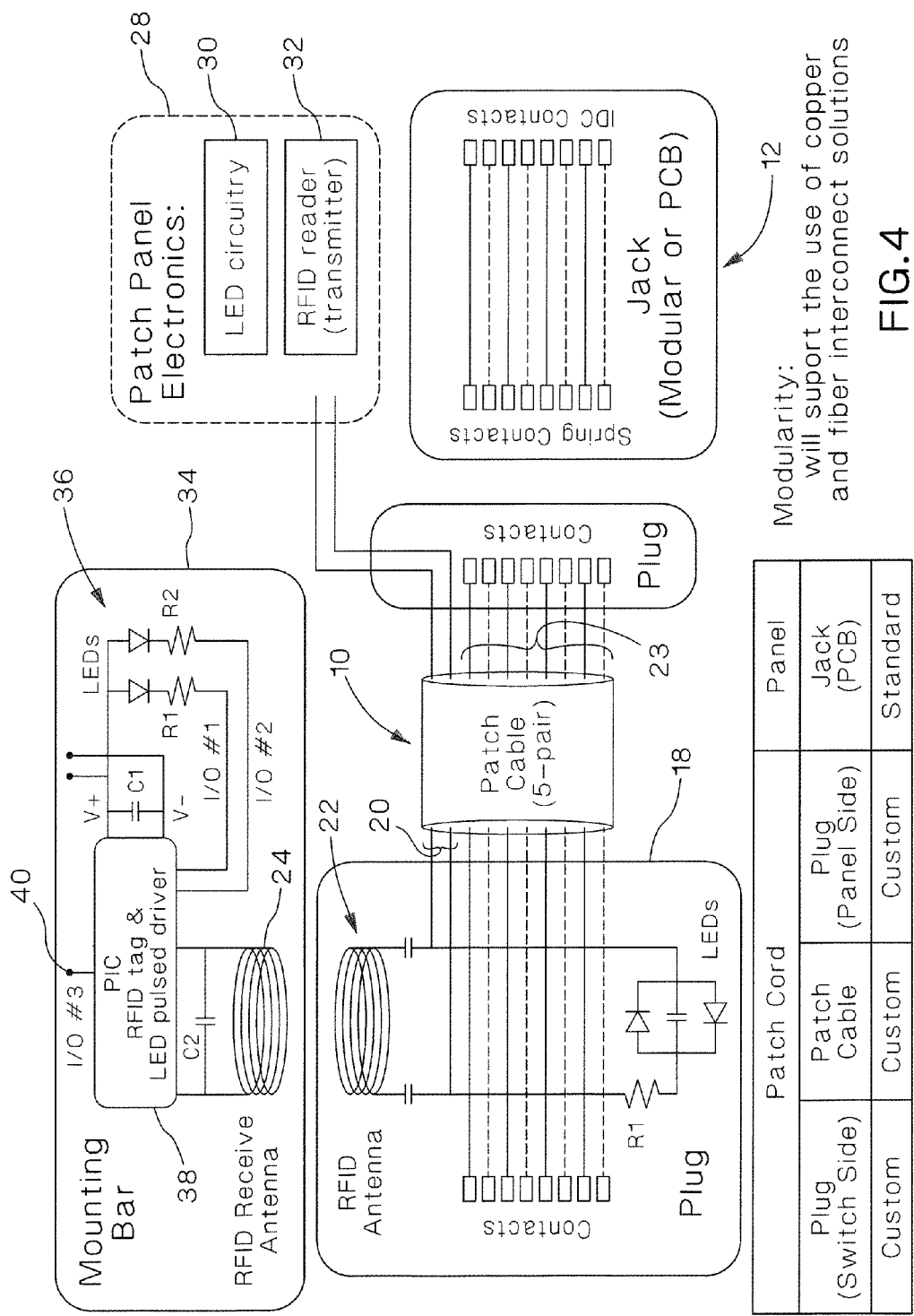
FIG. 4 is a schematic diagram of a patch cable connection between a network switch port and a patch panel according to another embodiment of the present invention.

FIG. 4 is a schematic diagram in which an alternative embodiment of the mounting bar 34 is provided with mounting bar LED circuitry 36 associated with each switch port of a switch that the mounting bar 34 is mounted to. In this embodiment, the mounting bar has a peripheral interface controller (PIC) 38 associated with each port. The PIC 38 can receive input via input 40. The PIC 38 outputs signals that control the LEDs in the LED circuitry 36. The signaling to control the circuitry may be received via the RFID receive antenna 24, or from a primary mounting bar PIC 42 (shown in FIGS. 5 and 6).

Figure 5:
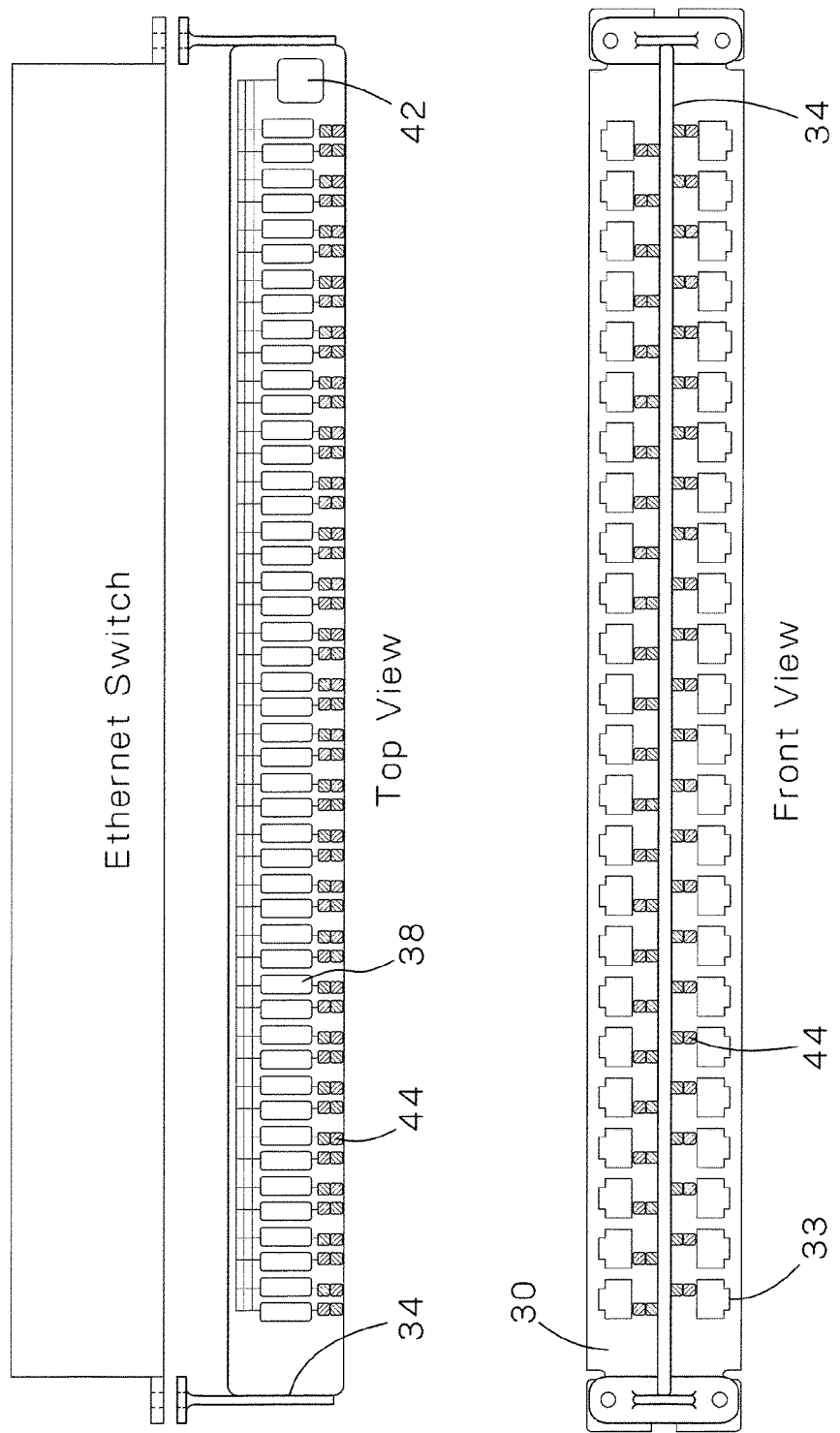
FIG. 5 contains front and top views of an RFID tag mounting bar having LEDs associated with ports.

FIG. 5 contains front and top views of the alternative mounting bar 34 mounted to an Ethernet switch 30. The mounting bar 34 contains LEDs 44 associated with each switch port 33. The primary PIC 42 is electrically connected to each port PIC 38 and can communicate with each port PIC 38 to control and receive lighting instructions and other information associated with each Ethernet port 33. Power to illuminate the LEDs 44 can be derived from the RFID signal (which can be a 125 kHz signal) transmitted over the patch cable 10. The RFID tag IC's associated with each port (which may be provided along with the port PICs 38 in a single module along with an LED pulsed driver as shown in FIG. 4) also derive their power in the same manner.

Figure 6:
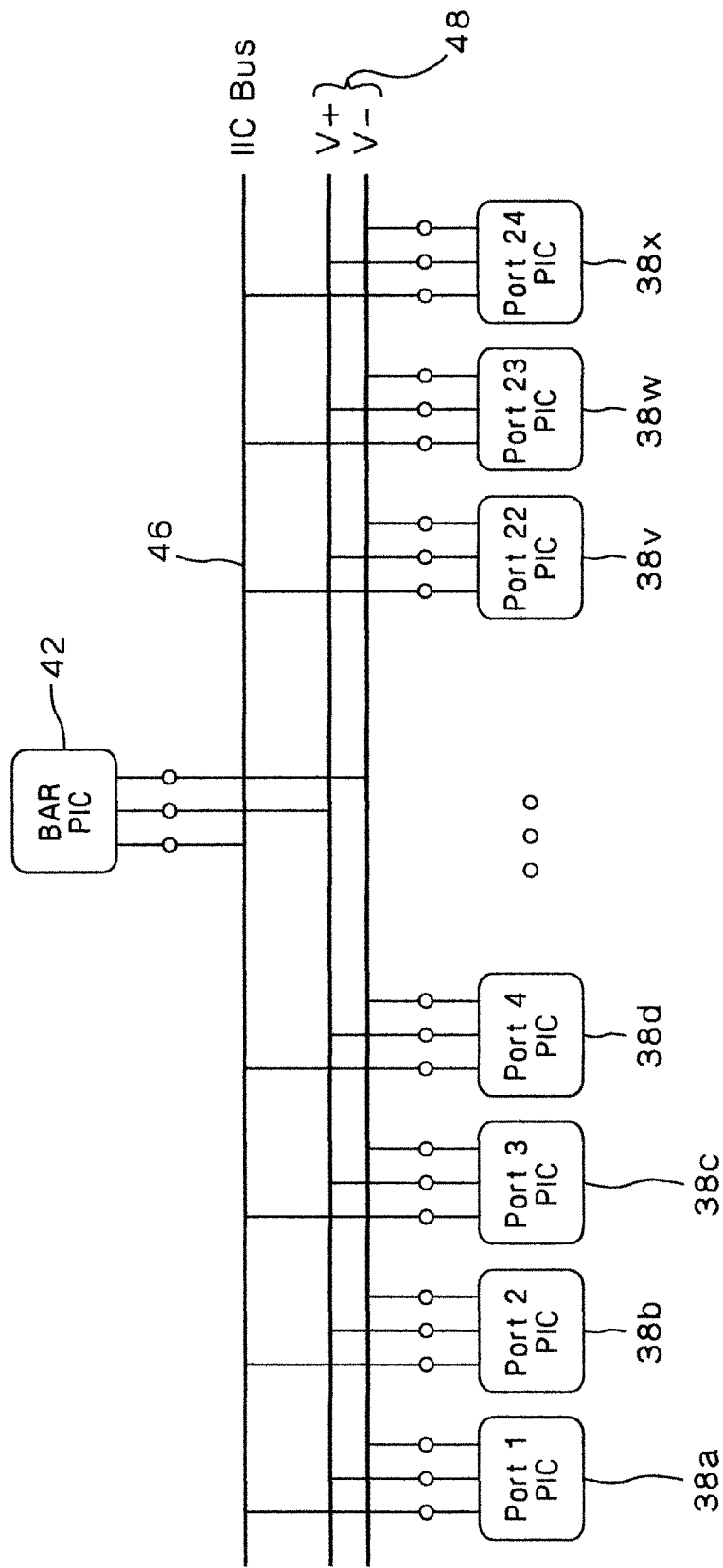
FIG. 6 is a schematic view of mounting bar and port circuitry.

FIG. 6 is a schematic view of the electronic architecture of the alternative mounting bar 34. The primary PIC 42 is adapted to communicate with the port PICs 38a-38x via an inter-IC bus 46. The power supply lines 48 are parallel, and according to one embodiment, control signals and a supply voltage for the entire mounting bar 34 can be established whenever one patch cord is plugged into the switch 30.

Figure 7:
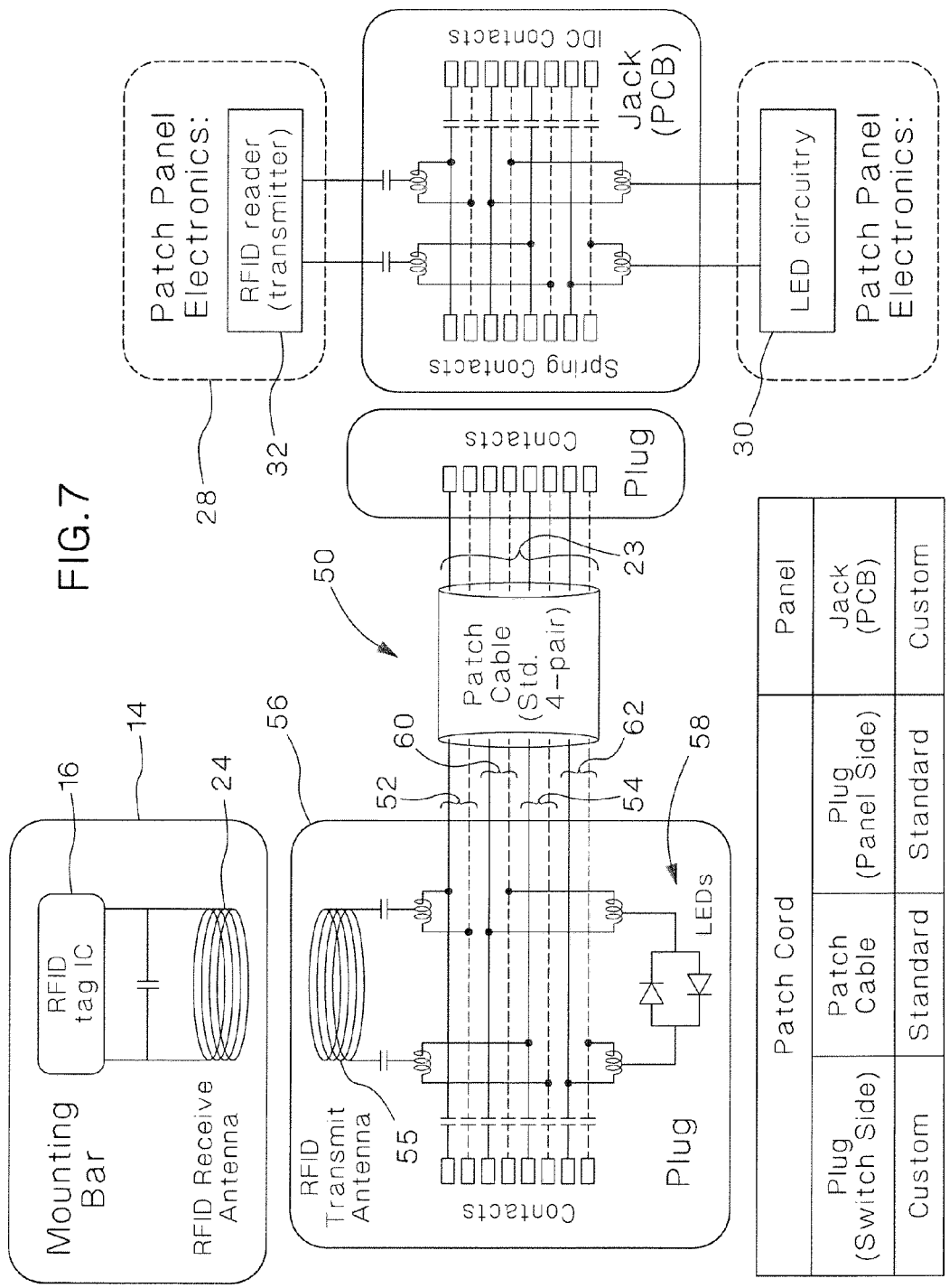
FIG. 7 is a schematic diagram of a patch cable connection between a network switch port and a patch panel according to another embodiment of the present invention.

FIG. 7 is a schematic view of an alternative embodiment in which a four-pair patch cable 50 is used to support communication between the patch panel electronics 28 and the RFID tag IC 16 associated with each switch port. Common mode signaling over two pairs of wires 52 and 54 is used for communication between the RFID transmitter 32 of the patch panel and the RFID tag IC 16 associated with each switch port via an RFID antenna 55. The information transmitted over these pairs includes ID information allowing the patch panel to determine which switch and port the switch plug 56 is plugged into. LED circuitry 58 provided in the switch plug 56 is connected to third and fourth wire pairs 60 and 62, and common mode techniques can be used to enable LED circuitry 30 of the patch panel to control the LEDs in the switch plug 56.

Figure 8:
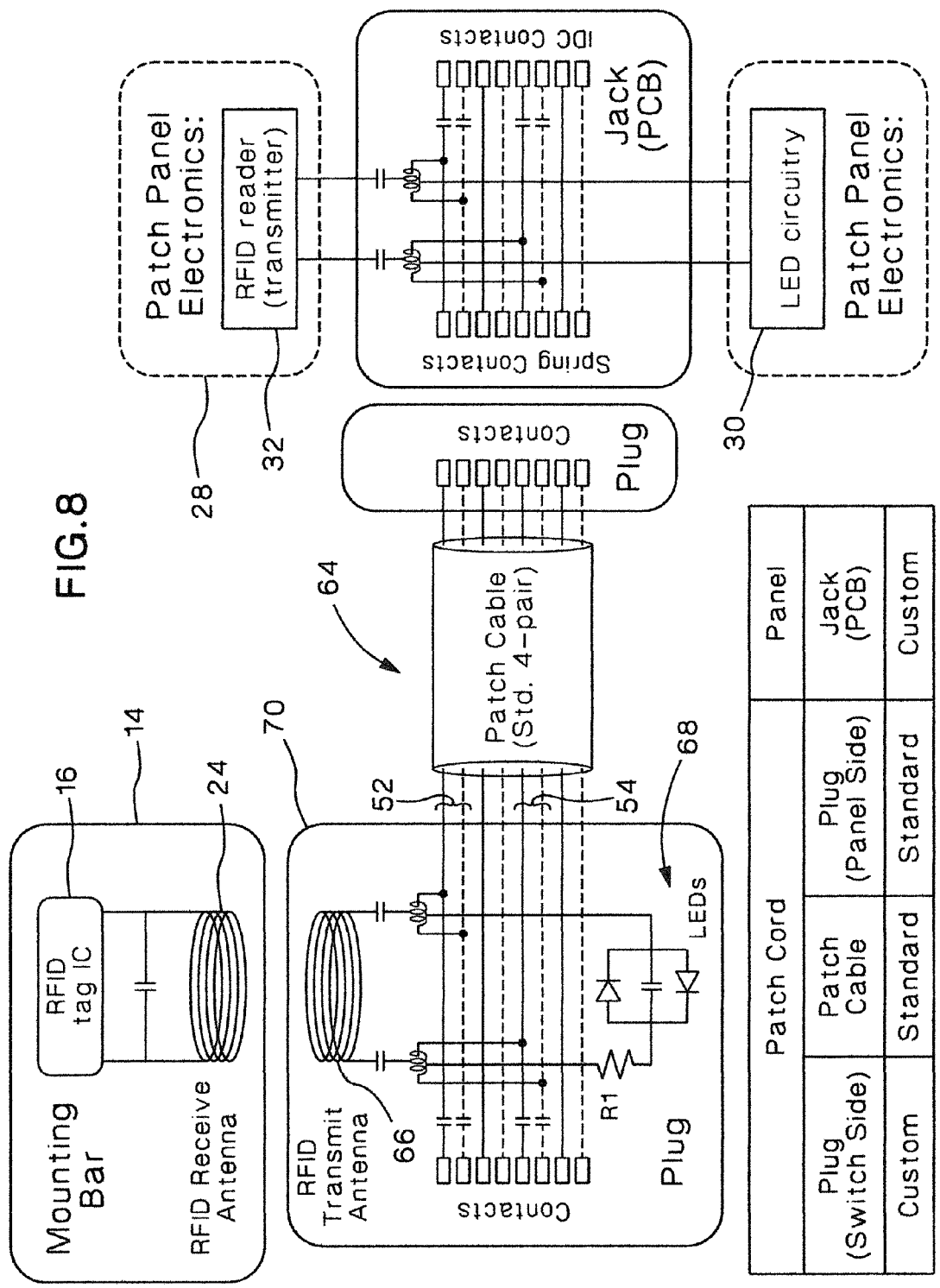
FIG. 8 is a schematic diagram of a patch cable connection between a network switch port and a patch panel according to an alternative embodiment of the present invention.

FIG. 8 is a schematic view of another embodiment in which an alternative four-pair patch cable 64 is provided with both an RFID antenna 66 and LED circuitry 68 electrically connected to two wire pairs 52 and 54 of the cable 64. The LED circuitry 30 and the RFID transmitter 32 of the patch panel are adapted to communicate with the RFID antenna 66 and the LED circuitry 68 provided within the switch plug 70 using common-mode signaling techniques.

Figure 9:
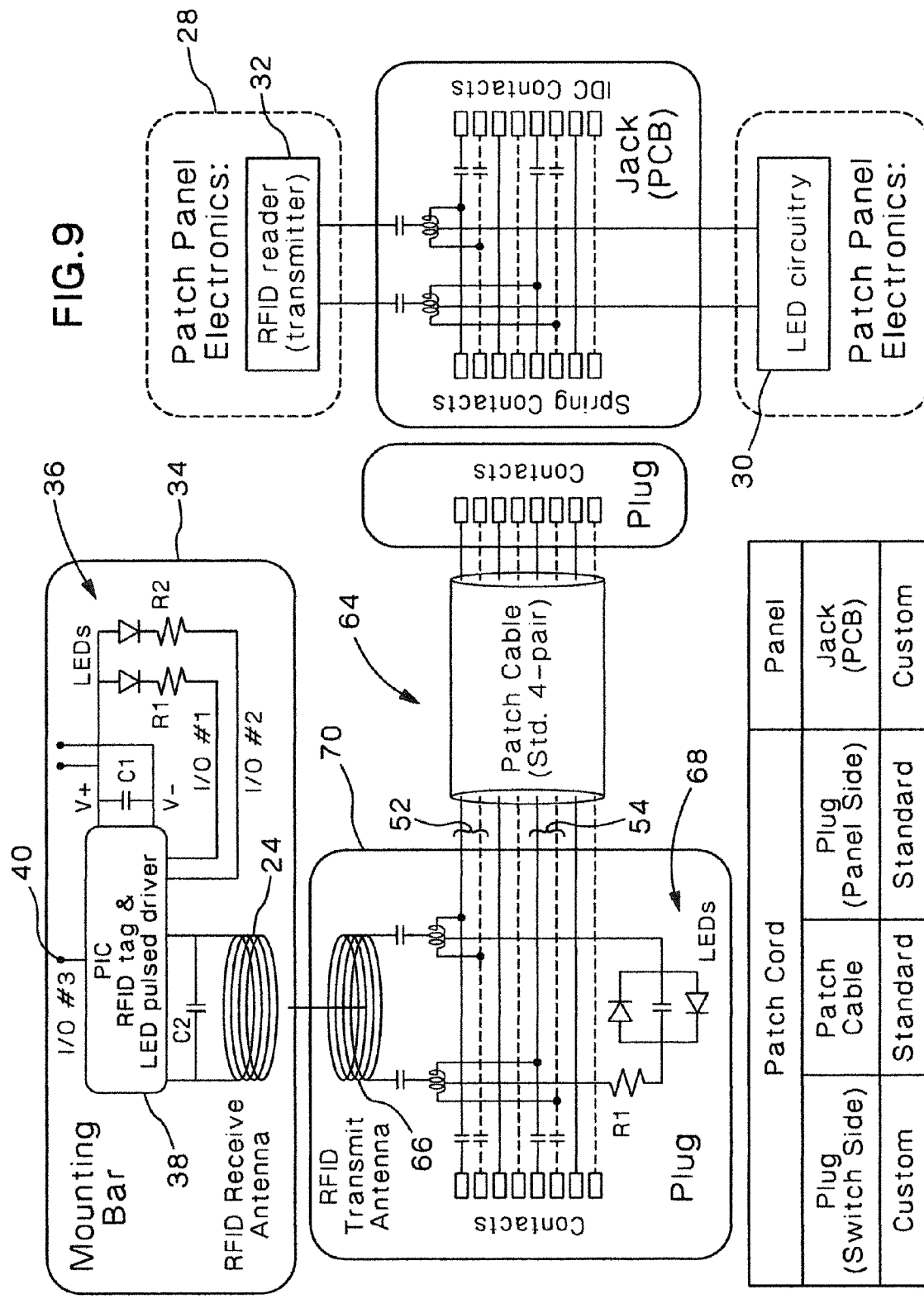
FIG. 9 is a schematic diagram of a patch cable connection between a network switch port and a patch panel according to another embodiment of the present invention.

FIG. 9 is a schematic view of an alternative embodiment of the present invention that combines features of the embodiments shown in FIGS. 4 and 8. The alternative mounting bar 34 is used in combination with the patch cable 64 to allow control of LED circuitry provided in both the switch plug 70 and the mounting bar 34.

Figure 10:
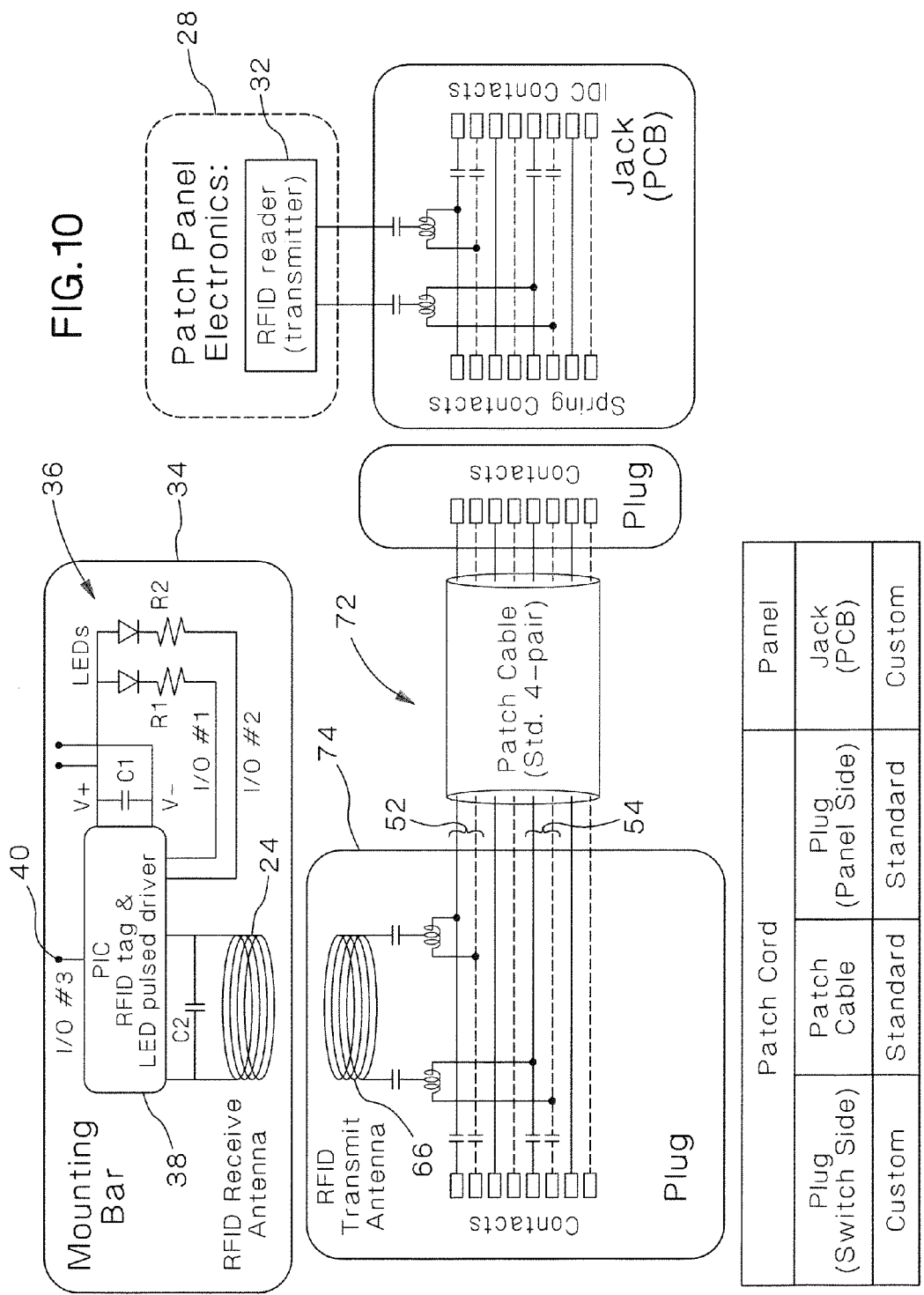
FIG. 10 is a schematic diagram of a patch cable connection between a network switch port and a patch panel according to another embodiment of the present invention.

FIG. 10 is a schematic view of another alternative embodiment of the present invention in which a four-pair patch cable 72 is provided with an RFID antenna 66 but no LED circuitry. LED circuitry 36 is provided on an alternative mounting bar 34 as discussed above with reference to FIGS. 4-6.

Intelligent patching and RFID reading systems of the present invention provide a number of functions and benefits. They can guide moves, adds, and changes of patch cords in interconnect systems. They can provide an administrator with real-time information regarding network status and monitor connectivity of patch cords. They can map patch fields and facilitate planning, implementation, and documentation of connectivity installations and removals. Further, the systems monitor patch field changes and alert administrators of any patch field changes or potential security risks, for example by communication with an NMS. A web-based management system may be used to allow access to the functions of the systems, and to interface with third-party network management systems, help desk applications, and other enterprise systems.

The invention claimed is:

1. A physical layer management system for an Ethernet system comprising:
a first Ethernet port, the first Ethernet port comprising a radio frequency identification (RFID) transceiver;
a second Ethernet outlet, the second Ethernet outlet comprising an RFID tag integrated circuit (IC); and
a patch cord, the patch cord comprising for pairs of conductors dedicated to carrying Ethernet signals and a fifth pair of conductors dedicated to carrying signals between the RFID transceiver and the RFID tag IC, the RFID transceiver and the RFID tag IC each configured to transmit and receive signals over the fifth pair of conductors of the patch cord.

2. The system of claim 1 further comprising a plug, the plug comprising an antenna configured to allow the RFID tag IC to send and receive signals over the fifth pair of conductors.

3. The system of claim 1 wherein the first Ethernet port is contained within a patch panel and the second Ethernet port is contained within a network switch.

4. The system of claim 3 wherein the RFID tag IC is contained within a mounting bar mounted on the network switch proximate to the second Ethernet port.

5. The system of claim 4 further comprising at least one light emitting diode (LED).

6. The system of claim 5 wherein the at least one LED comprises a red LED and a green LED.

7. The system of claim 5 wherein the mounting bar further comprises at least one port peripheral interface controller (PIC) configured to control illumination of the at least one LED.

8. The system of claim 7 further comprising a primary mounting bar PIC configured to communicate with the at least one port PIC.

* * * * *

UNITED STATES PATENT AND TRADEMARK OFFICE
CERTIFICATE OF CORRECTION

| | | |
|---|---|---|
| PATENT NO. | : 8,686,870 B2 | Page 1 of 1 |
| APPLICATION NO. | : 13/255826 | |
| DATED | : April 1, 2014 | |
| INVENTOR(S) | : Jack E. Caveney et al. | |

It is certified that error appears in the above-identified patent and that said Letters Patent is hereby corrected as shown below:

In The Specification

Column 2, line 25 which reads "...bar mounter to an Ethernet switch;" should read "...bar mounted to an Ethernet switch;"

Signed and Sealed this
Twenty-fourth Day of March, 2015

Michelle K. Lee
*Director of the United States Patent and Trademark Office*